United States Patent [19]
Gadsby et al.

[11] Patent Number: 5,825,781
[45] Date of Patent: Oct. 20, 1998

[54] PULSE AMPLITUDE MODULATED TONE GENERATOR

[75] Inventors: Winston M. Gadsby, Herndon; Jeffery M. Davis, Manassas, both of Va.

[73] Assignee: Hubbell, Inc., Orange, Conn.

[21] Appl. No.: 580,023

[22] Filed: Dec. 20, 1995

[51] Int. Cl.⁶ .................................................. H04J 3/02
[52] U.S. Cl. .......................................... 370/525; 370/532
[58] Field of Search .................................. 370/212, 213,
370/303, 304, 308, 309, 503, 522, 525,
518, 532, 537, 540, 546; 340/825.2, 825.57,
825.65, 825.67, 825.77, 825.78; 341/158,
161

[56] References Cited

U.S. PATENT DOCUMENTS

| | | | |
|---|---|---|---|
| 4,205,203 | 5/1980 | Mehta et al. | 370/525 |
| 4,383,313 | 5/1983 | Sbuelz | 370/51 |
| 4,432,031 | 2/1984 | Premerlani | 361/97 |
| 4,607,345 | 8/1986 | Mehta | 364/900 |
| 4,620,294 | 10/1986 | Leung et al. | 364/900 |
| 4,627,047 | 12/1986 | Pitroda et al. | 370/58 |
| 4,882,586 | 11/1989 | Dolph et al. | 341/169 |
| 4,967,195 | 10/1990 | Shipley | 340/825.52 |
| 5,281,756 | 1/1994 | Kawashima | 84/615 |
| 5,576,695 | 11/1996 | Minger et al. | 340/649 |

*Primary Examiner*—Alpus H. Hsu
*Assistant Examiner*—Kwang B. Yao
*Attorney, Agent, or Firm*—Jerry M. Presson; Stacey J. Longanecker

[57] ABSTRACT

A tone generating circuit comprises a counter circuit having a clock input for receiving a clock signal and a plurality of outputs which generate sequential binary values in response to transitioning of the clock signal; a multiplexer having several inputs, a number of select lines connected to the counter circuit outputs, and at least one output; and a resistor divider network connected to the multiplexer inputs. The multiplexer select lines select one of the multiplexer inputs in accordance with the binary value received from the counter circuit. The multiplexer inputs are connected to different taps on the resistor divider network. The counter selects multiplexer inputs on the falling edge of the clock signal, while the output signal level transitions before the rising edge of the clock signal.

9 Claims, 2 Drawing Sheets

5,825,781

PULSE AMPLITUDE MODULATED TONE GENERATOR

BACKGROUND OF THE INVENTION

In T-1 digital carrier systems, a channel bank samples voice signals using pulse amplitude modulation. The channel bank subsequently converts the pulse amplitude modulated (PAM) signal to an eight bit encoded digital signal, interleaves the encoded signal with 23 other voice channels and transmits an output bit stream at 1.544 megabits per second over a line.

According to well known sampling theories, an analog waveform such as a voice signal can be digitally represented if samples are taken at least every 125 microseconds. Thus, the cyclic basis of sampling, multiplexing and de-multiplexing in many telecommunication switching systems uses a basic system clock rate of 8 kHz. Accordingly, voice channels in a channel bank are typically sampled 8,000 times per second or slightly more than twice the upper frequency limit of voice signals passable by most telecommunication switching systems (i.e., 4 kHz).

Channel banks typically comprise a number of line cards having voice and/or data ports for interfacing subscriber equipment with a digital network. Some line cards can include means for tone generation to simplify calibration and/or troubleshooting, or to indicate call processing states, for example. These line cards interface with a PAM bus. The PAM bus connects to a converter unit that converter PAM signals from the subscriber lines into pulse code modulated (PCM) voice signals for processing by the digital network.

Tone generation in a number of existing PAM bus interfaces such as channel bank line cards is subject to distortion, that is, the signals are conventionally for generated using analog means, then processed two times. The analog-to-PAM conversion process generates some distortion to which more distortion is added during PAM-to-digital conversion. Thus, the quality of the sine wave created using the sampled signal degrades.

A need exists for a circuit which generates a 1 kHz tone having a sampling rate of 8,000 samples per second or eight samples per cycle at a low cost.

SUMMARY OF THE INVENTION

In accordance with an embodiment of the present invention, a tone generating circuit is provided for generating a 1 kHz tone for transmission on a PAM bus. The tone generating circuit uses an 8 kHz system clock to generate switched analog signal levels at an 8 kHz sampling rate.

In accordance with another aspect of the present invention, the tone generating circuit generates analog signal levels using four different voltages and switches the analog signals to create an eight sample sine wave.

In accordance with another aspect of the present invention, the tone generating circuit coordinates sampling times with the transitioning of the analog output signal. For example, the circuit generates analog signal levels for output onto a PAM bus on the falling edges of the system clock, while the switched analog output signals are sampled on the rising edges of the clock. Alternatively, the analog signal levels can be generated on the rising edges of the system clock and applied to the PAM bus on the falling edges of the system clock.

A tone generating circuit constructed in accordance with an embodiment of the present invention comprises a counter circuit having a clock input for receiving a clock signal and a plurality of outputs which generate sequential binary values in response to transitioning of the clock signal; a multiplexer having a plurality of inputs, a number of select lines connected to the counter circuit outputs, at least one output and a resistor divider network connected to the multiplexer inputs. The multiplexer select lines select one of the multiplexer inputs in accordance with the binary value received from the counter circuit. The multiplexer inputs are connected to different taps on the resistor divider network. Accordingly, the multiplexer output signal level depends on which input is selected and to which tap the multiplexer input is connected on the resistor divider network.

BRIEF DESCRIPTION OF THE DRAWINGS

These and other features and advantages of the present invention will be more readily apprehended from the following detailed description when read in connection with the appended drawings, which form a part of this original disclosure, and wherein.

DETAILED DESCRIPTION OF THE PREFERRED EMBODIMENT

Figure 1:
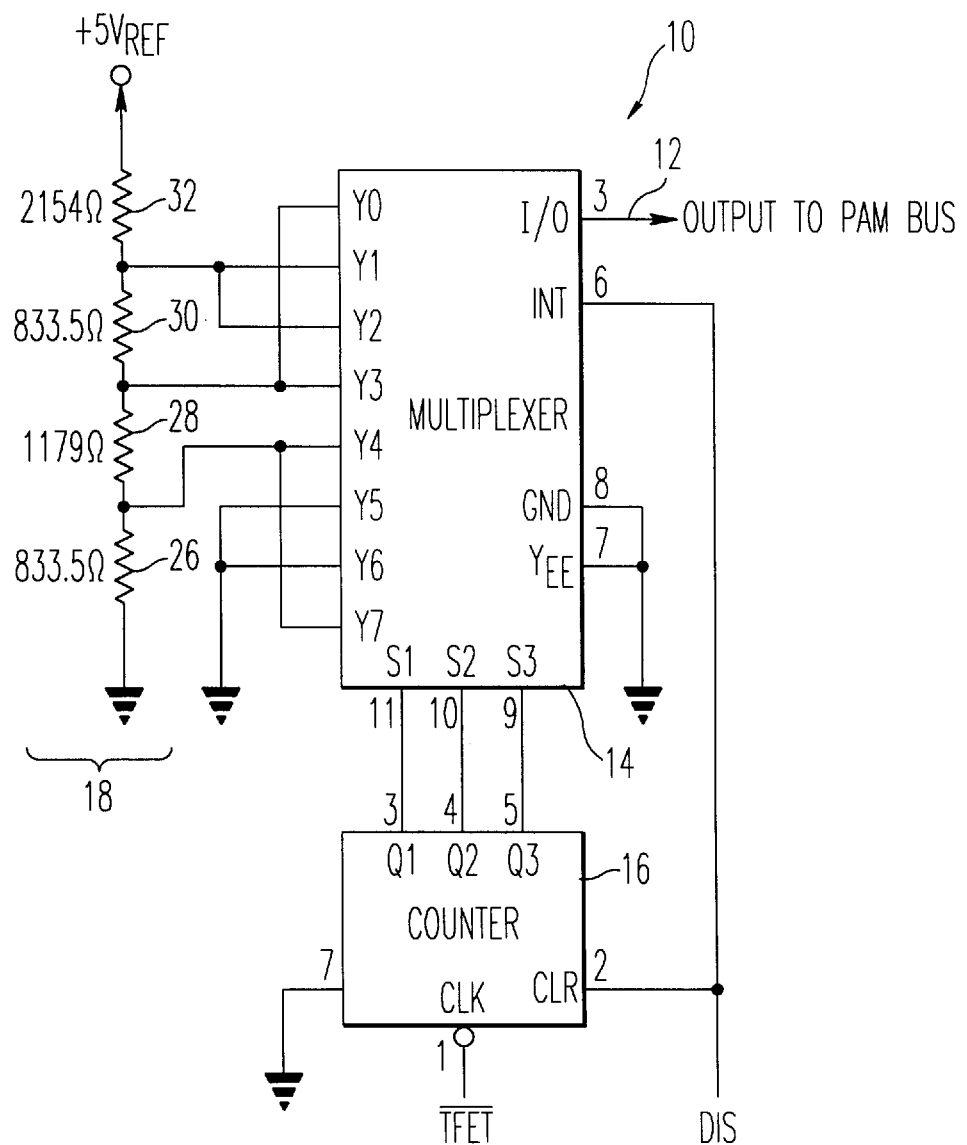
FIG. 1 is a schematic diagram of a tone generating circuit constructed in accordance with an embodiment of the present invention.

With reference to FIG. 1, a tone generating circuit 10 is shown which produces discrete voltage samples representing a sine wave at its output 12. The tone generating circuit 10 preferably comprises an 8-to-1 analog multiplexer 14 (e.g., a model 74HC4051 multiplexer manufactured by National Semiconductor, Santa Clara, Calif. The multiplexer 14 comprises eight inputs $Y_0$–$Y_7$, one of which is connected to the single output 12 depending on the current state of each of three select lines $S_1$–$S_3$. The select lines $S_1$–$S_3$ are connected to a 4-bit synchronous counter device 16 (e.g., a model 74HC393 counter manufactured by National Semiconductors, Santa Clara, Calif. Three of the four counter outputs $Q_1$–$Q_3$ are used to generate eight binary states and are connected to the three select lines $S_1$–$S_3$ of the multiplexer 14. Upon application of an inverted system clock signal (e.g., an 8 kHz signal $\overline{TFET}$, the counter 16 commences sequentially generating the eight binary states. The application of each of these states at the select lines $S_1$–$S_3$ causes the multiplexer to supply the voltage at the corresponding one of the inputs $Y_0$–$Y_7$ to the output 12. The voltage on each of the eight inputs $Y_0$–$Y_7$ of the multiplexer 14 is determined by a resistor divider network 18, which provides four different voltages including ground to the multiplexer 14.

Figure 2:
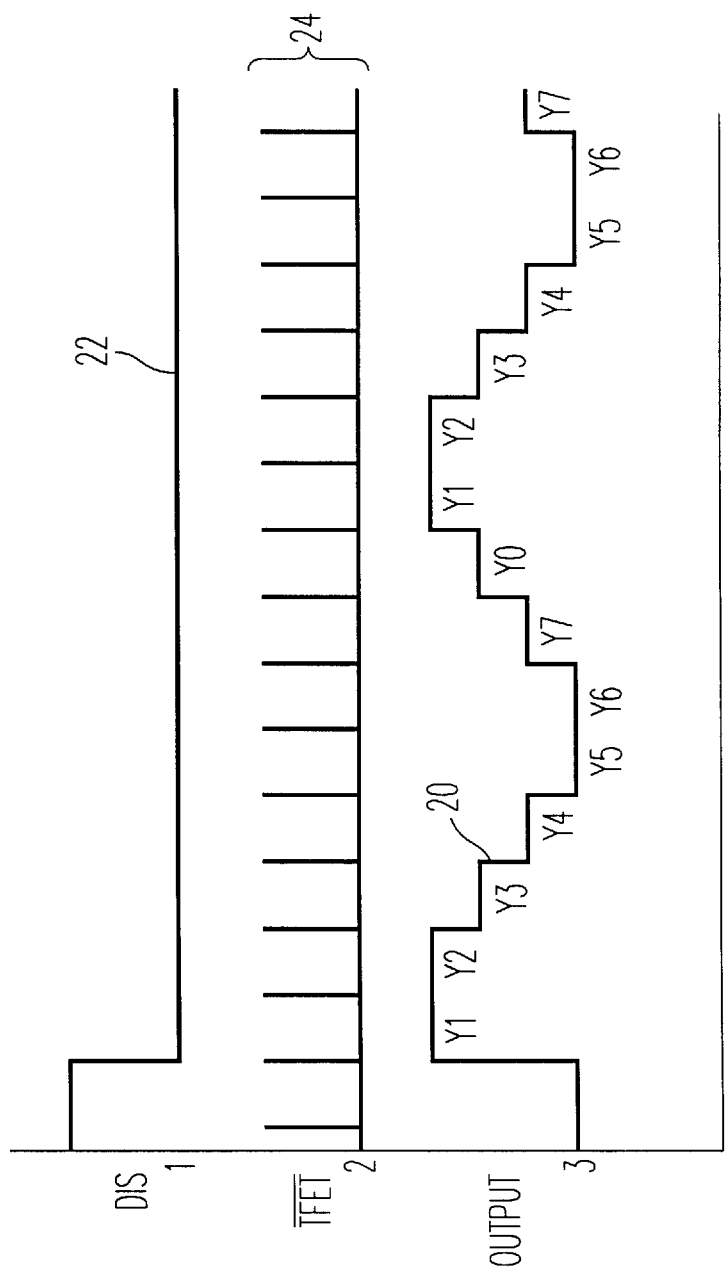
FIG. 2 is a graph illustrating an output waveform generated by the tone generating circuit depicted in FIG. 1, along with disable (DIS) and system clock ($\overline{TFET}$) waveforms.

The resistor divider network 18 values are selected by calculating the voltages required for eight, equally spaced in time, sampled points on a sine wave. By routing the proper voltages from the resistor divider network 18 through the multiplexer output 12 at the proper time intervals, an eight sample waveform of four different voltages is produced to represent a sine wave 20, as shown in FIG. 2. With reference to FIG. 2, a disable (DIS) signal 22 can be generated by a microcontroller (not shown) in a channel bank for application to both the counter 16 and the multiplexer 14. When the DIS signal is low, the multiplexer 14 begins to generate an output signal, as indicated generally by 22 in FIG. 2. Upon each transition of the clock signal $\overline{TFET}$ 24, the multiplexer 14 generates another output signal level, depending on which multiplexer input was selected.

In the illustrative circuit shown in FIG. 1, the resistor network comprises an 833.5 ohm resistor 26, a 1179 ohm resistor 28, an 833.5 ohm resistor 30 and a 2154 ohm resistor 32 connected in series. The resistors 26–32 operate as a voltage divider with an input voltage of 5 volts. The inputs $Y_5$ and $Y_6$ are connected to ground and produce a zero volt output signal. Multiplexer inputs $Y_7$ and $Y_4$ receive a 0.8335 volt output signal. Multiplexer inputs $Y_3$ and $Y_0$ receive a 2.0125 volt output signal. Multiplexer inputs $Y_1$ and $Y_2$ require a 2.846 volt output signal. The selected inputs and their corresponding signal levels are shown in FIG. 2. The output signal voltage levels are positive voltages in the present example. Output signal voltage levels, however, can be negative or can be ground-centered with the addition of an output capacitor and resistor at pin 3 of the multiplexer.

The sampled output signal 20 is suitable for application to a PAM bus. By using a multiplexer in accordance with the present invention, the sampling and signal output times are coordinated, that is, multiplexer output 12 cannot transition during the sampling times (i.e., when the inputs $Y_0$–$Y_7$ are selected). The counter preferably changes state on the falling edges of the clock signal $\overline{TFET}$. The counter in turn provides a binary value (e.g., a value between 000 and 111) to the select lines $S_1$–$S_3$ of the multiplexer. By virtue of the multiplexer timing characteristics, the output signal 12 transitions to a new voltage level corresponding to the selected input $Y_0$–$Y_7$ before the rising edge of the clock signal. Alternatively, another type of counter can be used which changes states on the rising edges of the clock signal, while the output 12 signal level transitions on the falling edges of the clock signal. The output signal, therefore, transitions each clock cycle to create an eight sample, 1 kHz sine wave consisting of four different voltage levels. Thus, the four voltage levels can be applied to the bus approximately 2,000 times per second. The tone levels remain accurate and the integrity of the sine wave tone signal is maintained by virtue of the dependence of the multiplexer on the counter for selecting inputs, and the operation of the counter using a system clock.

While certain advantageous embodiments have been chosen to illustrate the invention, it will be understood by those skilled in the art that various changes and modifications can be made herein without departing from the scope of the invention as defined in the appended claims.

What is claimed is:

1. A circuit for generating a tone comprising:

a counter circuit having an input for receiving a clock signal and a plurality of outputs, said counter circuit being operable to generate sequential binary values at said plurality of outputs in response to said clock signal;

a multiplexer having a plurality of inputs, a plurality of select lines connected to said plurality of outputs of said counter circuit, and at least one output, said plurality of select lines being operable to select at least one of said plurality of inputs corresponding to one of said binary values for generating an output signal at said at least one output of said multiplexer; and a resistor divider circuit comprising a voltage source, a ground reference and a plurality of resistors connected in series with each other between said voltage source and said ground reference to provide a plurality of nodes located between respective ones of said plurality of resistors and having different voltages, different ones of said plurality of inputs of said multiplexer being connected to different ones of said plurality of nodes, said output signal having a different one of a plurality of voltage levels depending on which of said plurality of inputs of said multiplexer is selected by said counter circuit.

2. A tone generating circuit as claimed in claim 1, wherein said counter circuit selects at least one of said plurality of inputs substantially coincidentally with one of a falling edge and a rising edge of said clock signals, and said output signal transitions to one of said plurality of voltage levels corresponding to said selected input substantially coincidentally with one of said rising edge and said falling edge, respectively, of said clock signal.

3. A tone generating circuit as claimed in claim 1, wherein said plurality of resistors are selected to generate a first number of voltage levels to approximate one half-cycle of a sinusoidal signal, said plurality of inputs of said multiplexer are paired and connected to respective ones of said plurality of nodes, and said counter is operable to generate said multiplexer output signal by changing the voltage level of said output signal to each of said voltage levels twice during each cycle of said sinusoidal signal.

4. A tone generating circuit as claimed in claim 1, wherein said counter circuit comprises at least three outputs, said plurality of inputs of said multiplexer comprises at least eight inputs, said plurality of select lines comprises at least three select lines, said clock signal is at least approximately 8000 Hertz and said output signal is at least approximately 1000 Hertz.

5. A tone generating circuit as claimed in claim 1, wherein said plurality of resistors are selected to generate at least four discrete voltage levels to approximate one half-cycle of a sinusoidal signal, said plurality of inputs of said multiplexer are paired and connected to respective ones of said plurality of nodes, and said counter is operable to generate said multiplexer output signal by changing the voltage level of said output signal to each of said voltage levels twice during each cycle of said output signal.

6. A method of generating a pulse amplitude modulated tone comprising the steps of:

generating a predetermined number of binary values sequentially in response to a clock input signal;

applying said binary values to the select inputs of a multiplexer to select corresponding ones of multiplexer inputs sequentially;

providing different voltage levels at respective ones of said multiplexer inputs, said voltage levels having values approximating at least one half-cycle of a sinusoidal signal; and coupling said voltage levels corresponding to said selected multiplexer inputs to a multiplexer output.

7. A tone generating method as claimed in claim 6, wherein the step of providing different voltage levels comprises the steps of pairing said multiplexer inputs and providing a first number of voltage levels at respective pairs of said multiplexer inputs, said output signal being an approximately sinusoidal signal in which each of said voltage levels occurs twice during each cycle thereof.

8. A tone generating method as claimed in claim 6, wherein said binary values are selected from a set of at least eight sequential binary values, said clock input signal is at least approximately 8 kilohertz, said multiplexer comprises at least eight multiplexer inputs and at least three select inputs and is operable to generate at least four of said different voltage levels, said coupling step comprising the step of generating an approximately sinusoidal output signal of at least approximately 1 kilohertz having each of said voltage levels occurring twice during each cycle thereof.

9. A tone generating method as claimed in claim 6, wherein said generating step and said applying step occur substantially coincidentally with at least one of a rising edge and a falling edge of said clock input signal, and said coupling step occurs substantially coincidentally with one of a falling edge and a rising edge, respectively, of said clock input signal.

* * * * *